(12) United States Patent
Davis

(10) Patent No.: US 7,003,483 B1
(45) Date of Patent: Feb. 21, 2006

(54) SYSTEM AND METHOD FOR OPTIMIZING THE NUMBER OF UNITS OF A SECURITY PURCHASED OR SOLD ON A PERIODIC BASIS

(75) Inventor: Andrew J. Davis, Williston, VT (US)

(73) Assignee: Sacco Company, Williston, VT (US)

( * ) Notice: Subject to any disclaimer, the term of this patent is extended or adjusted under 35 U.S.C. 154(b) by 774 days.

(21) Appl. No.: 09/663,407

(22) Filed: Sep. 15, 2000

Related U.S. Application Data

(60) Provisional application No. 60/154,634, filed on Sep. 17, 1999.

(51) Int. Cl.
*G06F 17/60* (2006.01)

(52) U.S. Cl. .............................. 705/36; 705/35; 705/37

(58) Field of Classification Search ................. 705/36, 705/37, 35, 1
See application file for complete search history.

(56) References Cited

U.S. PATENT DOCUMENTS

| | | | |
|---|---|---|---|
| 5,148,365 A | 9/1992 | Dembo ....................... | 364/402 |
| 5,774,881 A | 6/1998 | Friend et al. ................. | 705/36 |
| 5,799,287 A | 8/1998 | Dembo ......................... | 705/36 |
| 5,806,047 A | 9/1998 | Hackel et al. ................ | 705/36 |
| 5,806,049 A | 9/1998 | Petruzzi ...................... | 705/36 |
| 5,884,287 A | 3/1999 | Edesess ....................... | 705/36 |
| 5,930,775 A | 7/1999 | McCauley et al. ............ | 705/38 |
| 5,974,390 A | 10/1999 | Ross ............................. | 705/4 |
| 5,978,778 A | 11/1999 | O'Shaughnessy ............ | 705/36 |
| 5,991,743 A | 11/1999 | Irving et al. ................... | 705/36 |
| 6,018,722 A | 1/2000 | Ray et al. ..................... | 705/36 |
| 6,021,397 A | 2/2000 | Jones et al. ................... | 705/36 |
| 6,078,905 A | 6/2000 | Pich-LeWinter ............. | 705/36 |

FOREIGN PATENT DOCUMENTS

WO      WO 9215064 A1 *  9/1992

OTHER PUBLICATIONS

Consistent Investors Ignore the Fluctuations; Cost Averaging is Gradual Approach, by Russ Wiles and Albert J. Fredman, *The Arizona Republic*, Aug. 18, 1996, Final Chaser, p. D1.

Regular Instalments Make Smooth Ride, *South China Morning Post*, Nov. 2, 1997, Sunday Money Section, Family Money; p. 12.

Averaging Helps in Volatile Times, by Jade Hemeon, *The Toronto Star*, Dec. 31, 1997, Metro Edition.

Software Forces Investors to Buy Low and Sell High, *Business Wire*, Jul. 17, 1999.

(Continued)

*Primary Examiner*—Jagdish Patel
(74) *Attorney, Agent, or Firm*—Downs Rachlin Martin PLLC

(57) ABSTRACT

A system and method for calculating a number of units of a security or other investment instrument to be traded periodically in a fluctuating market in a manner that optimizes the per-unit dollar value of the corresponding transaction. The system and method each comprise equations for calculating the number of units to be purchased or sold during each of a plurality of transaction periods based upon (1) a target amount of money for purchasing, or to be received from the sale of, the security during each transaction period, (2) a non-zero baseline unit price and (3) a current per unit price during the corresponding transaction period. In one embodiment, each equation further includes a gain control that, when all other variables are fixed, allows an investor to adjust the number of units traded to suit his or investment goals and/or to suit market conditions.

34 Claims, 16 Drawing Sheets

OTHER PUBLICATIONS

The Position Cost Averaging Stock Investing System, http://www.stocksystem.com/ downloaded Jun. 10, 2000.

Mutual Funds/Russ Wiles; Your Money; Averaging Can Help During Rough Times, by Russ Wiles, *Los Angeles Times*, Aug. 18, 1996, Home Edition, Business Sect., Part D, p. 3, Financial Desk.

The Philadelphia Inquirer Personal Finance Column, by Jeff Brown, *The Philadelphia Inquirer*, May 23, 2000, KR-Acc-No.:PH-Finance-COL.

Minding Your Business; Two Ways to Invest While Dancing o a Beat, by Bruce Felton, *The New York Times*, Nov. 24, 1996, Late Edition-Final.

Strategic-Investing.Com Offers Stock Trading System for Long Term Investors, *PR Newswire*, Jun. 10, 2000, Financial News Section.

A Great Stock Trading Tool for Todays Market, *Portfolio Pilot Stock Trading System*, downloaded Sep. 30, 2000; http://www.strategic-investing.com/.

A Trading System for the Stock Market and Mutual Funds, *Portfolio Pilot Stock Trading System*, downloaded Sep. 30, 2000; http://www.strategic-investing.com/features.htm.

How to Sell, *Financial World*, Mar. 18, 1997, vol. 166, Issue 3, p. 68, Mutualfunds Section.

* cited by examiner

FIG.5

| FIG.5-1 | FIG.5-2 | FIG.5-3 |
| --- | --- | --- |
| FIG.5-4 | FIG.5-5 | FIG.5-6 |
| FIG.5-7 | FIG.5-8 | FIG.5-9 |

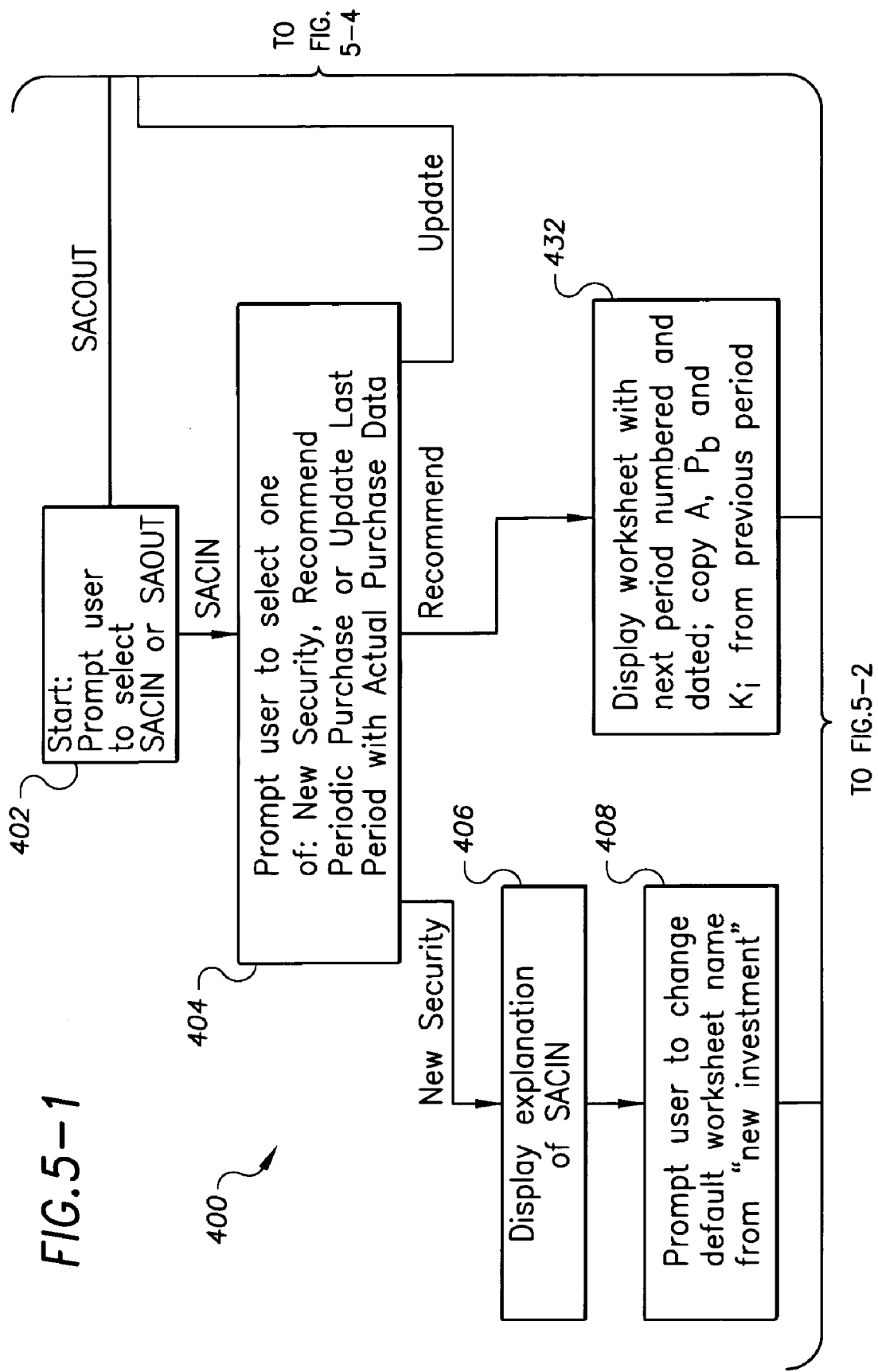

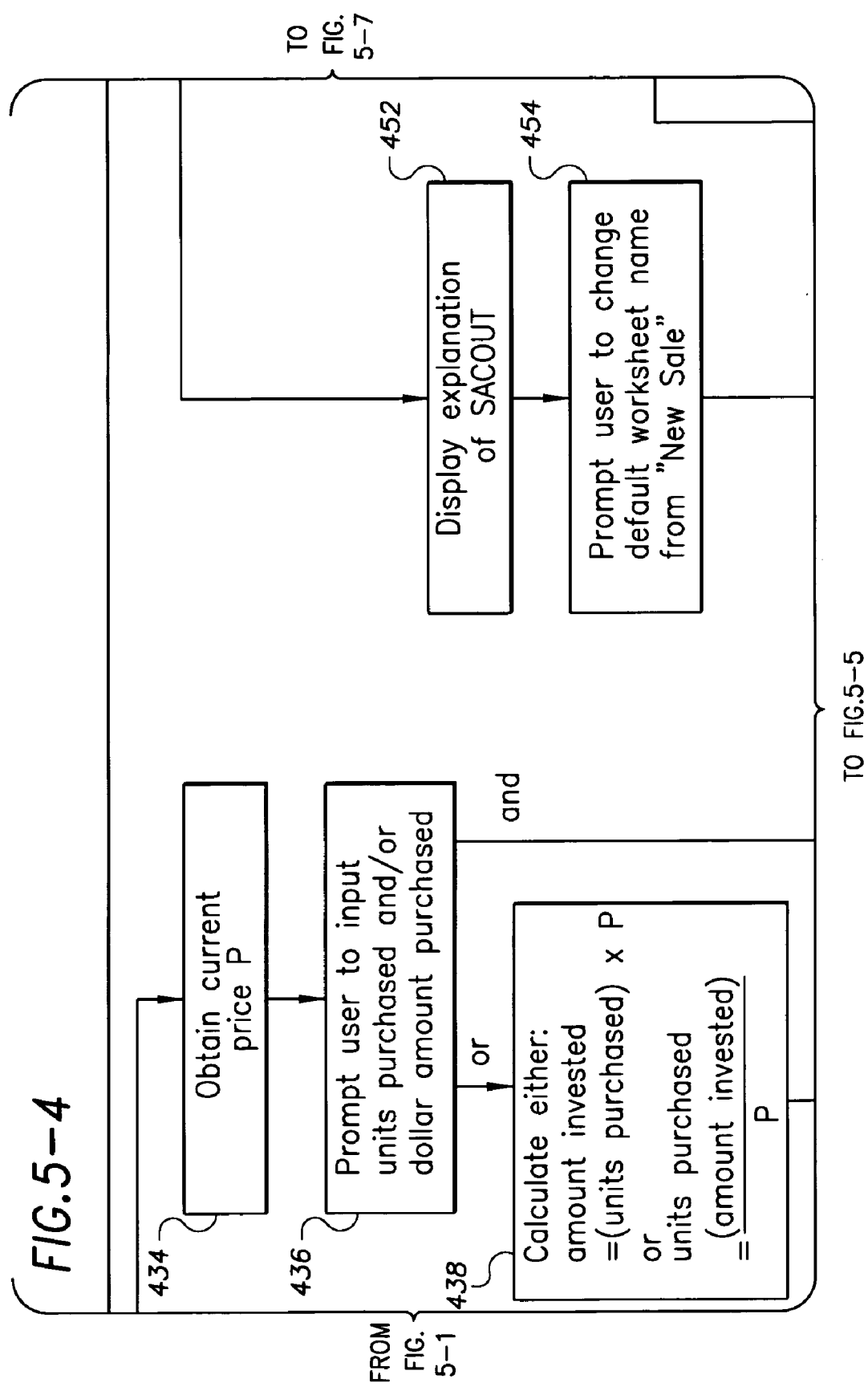

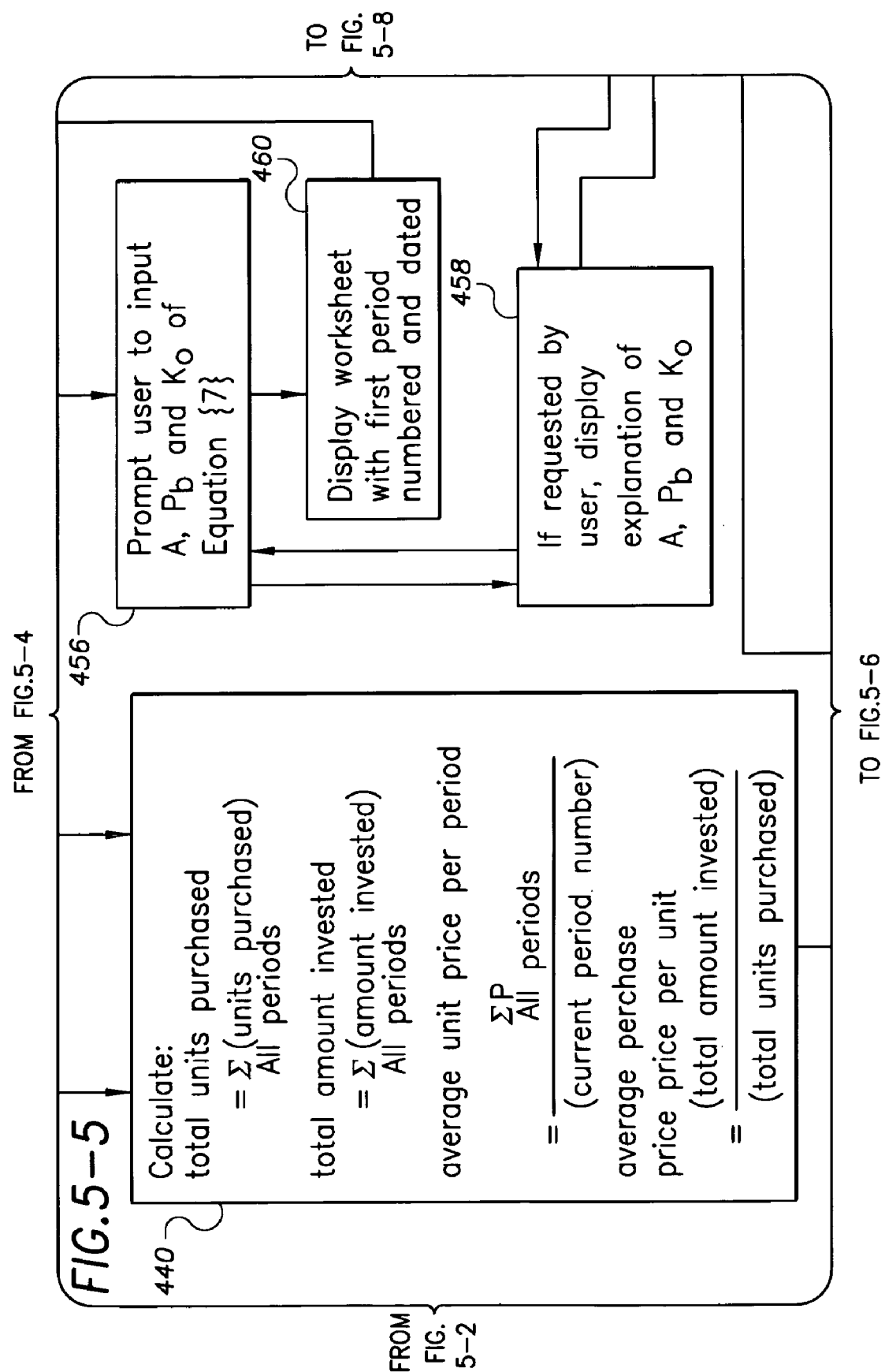

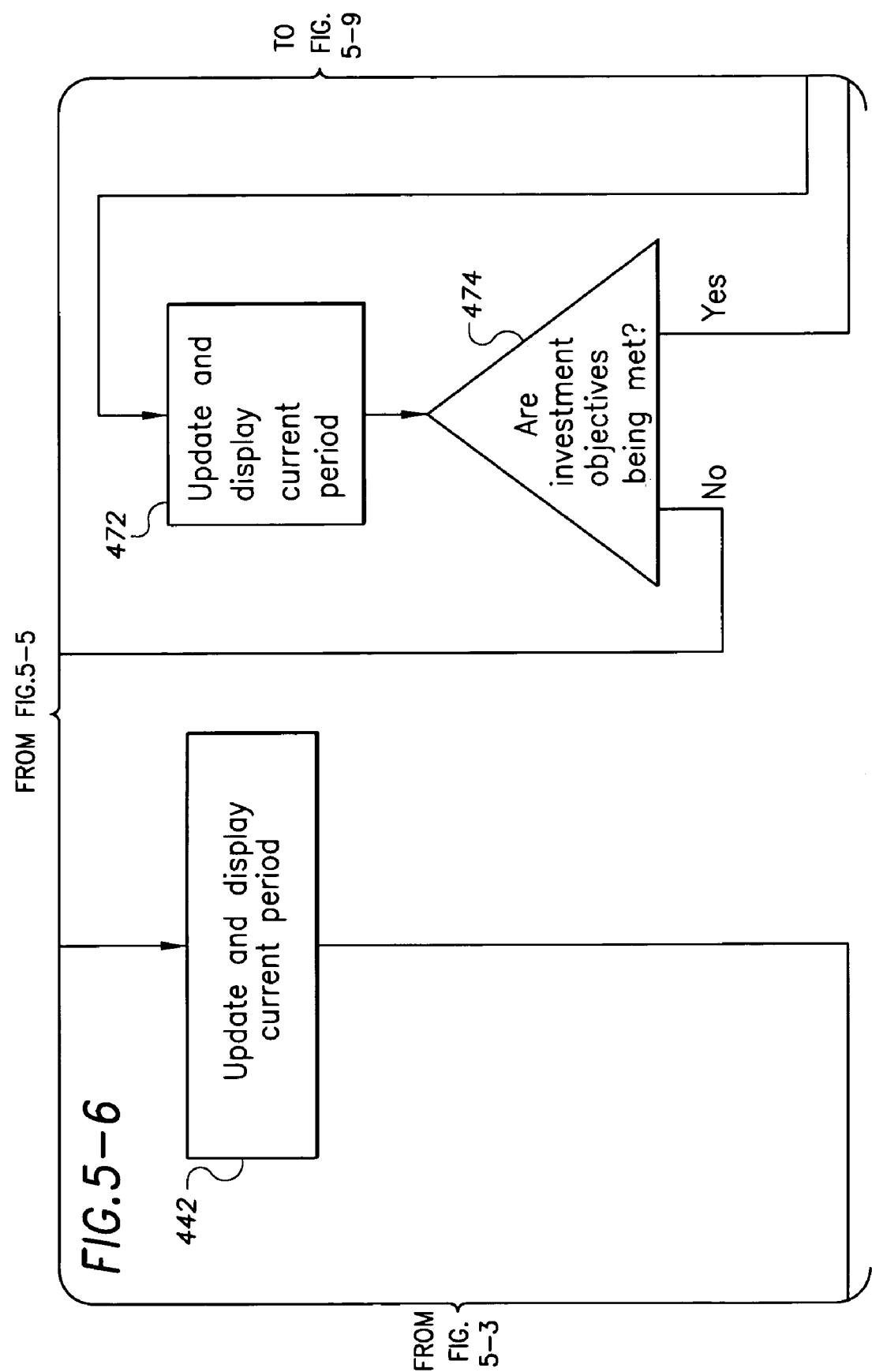

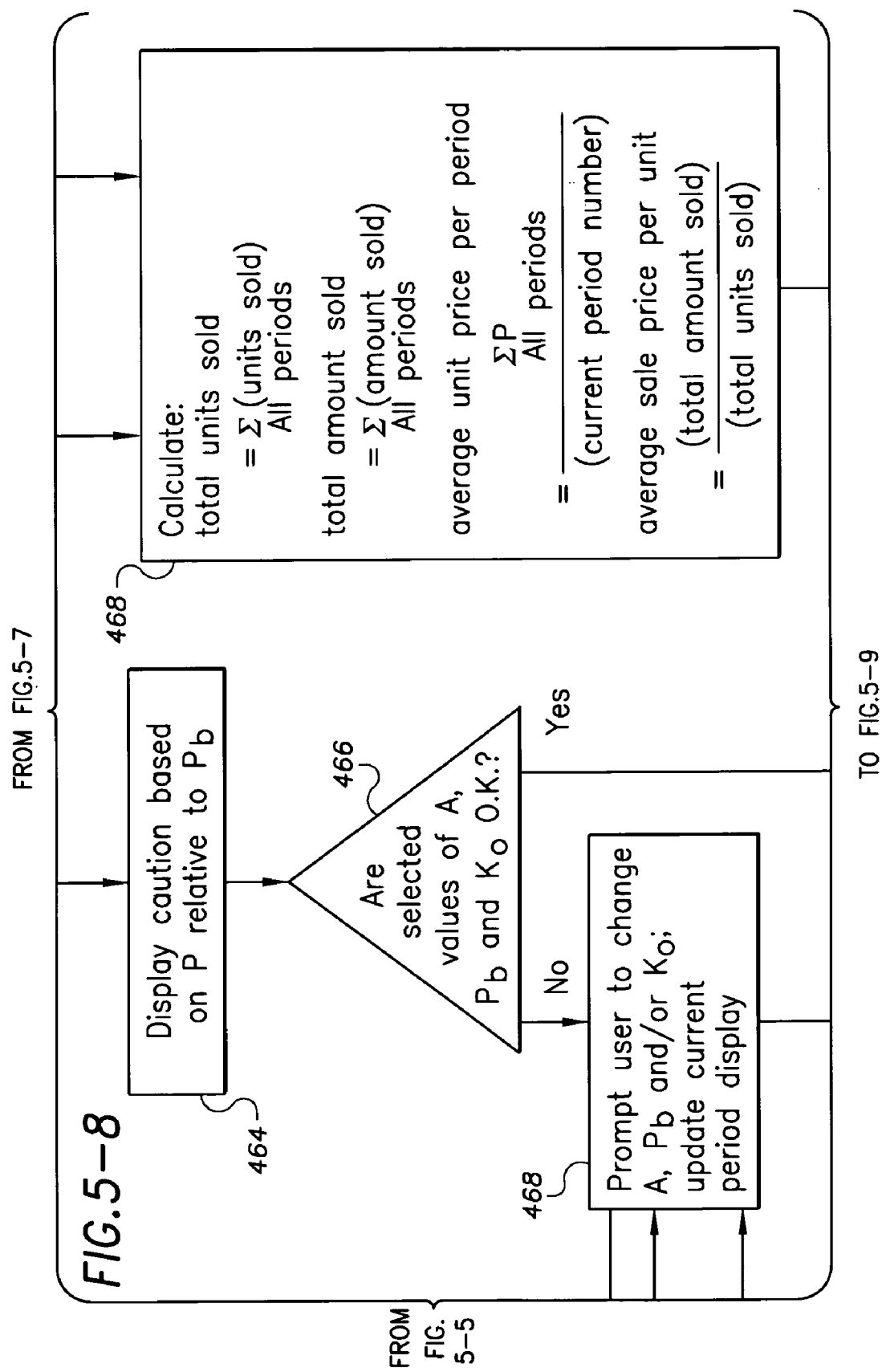

FIG.6A

SACIN Worksheet

Security Name: New Investment

| Period Number | Date | Periodic Data | | | | | Totals | | Performance | |
|---|---|---|---|---|---|---|---|---|---|---|
| | | A | $P_b$ | $K_i$ | Unit Price P | Units Purchased | Amount Invested | Units Purchased | Amount Invested | Avg. Unit Price | Avg. Purchase Price/Unit |
| 1 | MM/ DD/ YYYY | | | | | | | | | |
| | | | | | | | | | | |
| | | | | | | | | | | |
| | | | | | | | | | | |

502 ⏞ (Performance columns)

SACOUT WORKSHEET — 510

Security Name: New Sale

| Period Number | Periodic Data | | | | | Totals | | Performance — 512 | |
|---|---|---|---|---|---|---|---|---|---|
| | Date | A | $P_b$ | $K_o$ | Unit Price P | Units Sold | Amount Sold | Units Sold | Amount Sold | Avg. Unit Price | Avg. Sale Price/Unit |
| 1 | MM/DD/YYYY | | | | | | | | | | |

SYSTEM AND METHOD FOR OPTIMIZING THE NUMBER OF UNITS OF A SECURITY PURCHASED OR SOLD ON A PERIODIC BASIS

CROSS-REFERENCE TO RELATED APPLICATION

This application claims the benefit of priority of, and incorporates herein in its entirety, U.S. Provisional Application Ser. No. 60/154,634 filed Sep. 17, 1999, and entitled "System and Method for Optimizing Investment Withdrawal Amounts."

FIELD OF INVENTION

The present invention relates generally to the field of securities and other investment instruments. More particularly, the present invention is directed to a system and method for optimizing the number of units of a security or other investment instrument purchased or sold on a periodic basis.

BACKGROUND OF THE INVENTION

A number of methods exist for optimizing investments in securities such as stocks, bonds, mutual funds, futures and options, among others. At least one known method for optimizing investments in a fluctuating market is dollar cost averaging (DCA). DCA is a method for periodically purchasing units, or units, of a security in a manner such that the average per-unit cost over a plurality of periodic purchases will be less than the average price of the units over the entire period during which an investor makes the periodic purchases. DCA always results in an average per-unit cost lower than the average price, regardless of whether the long-term trend of the market is increasing or declining, as long as the purchase price fluctuates among the periodic purchases. DCA is an alternative to buying a fixed number of units periodically or buying a number of units at only one time with a lump sum of money and hoping that the price of the security increases between the time the units are purchased and the time they are sold.

DCA involves investing a fixed amount of money at regular intervals over an extended period of time. TABLE 1 illustrates the impact of DCA versus purchasing a fixed number of units over twelve periodic purchases.

TABLE 1

| Security Price Performance | | Fixed Number of Units | | DCA | |
|---|---|---|---|---|---|
| | | | Units | | Units Purchased |
| Period | Price | Cost | Purchased | Cost (A) | (N) |
| 1 | 10 | 100 | 10 | 100 | 10 |
| 2 | 11 | 110 | 10 | 100 | 9.09 |
| 3 | 9 | 90 | 10 | 100 | 11.11 |
| 4 | 10 | 100 | 10 | 100 | 10 |
| 5 | 11 | 110 | 10 | 100 | 9.09 |
| 6 | 9 | 90 | 10 | 100 | 11.11 |
| 7 | 10 | 100 | 10 | 100 | 1.0 |
| 8 | 11 | 110 | 10 | 100 | 9.09 |
| 9 | 9 | 90 | 10 | 100 | 11.11 |
| 10 | 10 | 100 | 10 | 100 | 10 |
| 11 | 11 | 110 | 10 | 100 | 9.09 |
| 12 | 9 | 90 | 10 | 100 | 11.11 |
| Total Cost | | $1,200 | | $1,200 | |
| Total Units | | | 120 | | 120.8 |
| Avg. Per-Unit Cost | | $10 | | $9.93 | |

As seen in TABLE 1, the fixed-dollar purchasing scheme of DCA results in fewer units being purchased when the per-unit price is high and more units being purchased when the per-unit price is low. In DCA, the number of units purchased each period can be expressed as:

$$N = \frac{A}{P - P_b} \quad \{1\}$$

where N is the number of units purchased, A is the dollar amount of the purchase, P is the current unit price at which the purchase is made and $P_b$ is a baseline unit price equal to zero. The equation for N is a simple hyperbolic function asymptotic to the N-axis as P approaches zero and asymptotic to the P-axis as P approaches infinity. DCA will always yield an average per-unit cost lower than the average price of the units over the entire period because DCA yields a weighted average, whereas purchasing a fixed number of units will result simply in the average per-unit cost being equal to the average price, which is an un-weighted average. DCA may be considered a weighted averaging because the number of units purchased with the fixed dollar amount varies inversely with the current per-unit price of the security at the time of purchase. That is, when the per-unit price is high, the fixed dollar amount purchases a smaller number of units than when the per-unit price is low. Thus, whenever the unit price of the security varies over a number of purchase periods, the total number of units purchased using DCA will always be greater than the total number of units purchased by purchasing a fixed number of units each period.

A drawback of DCA is that, while the number of units N purchased varies inversely with the price P, an investor is limited to the purchasing only the number of units given by the simple equation, N=A/P. In addition, DCA lacks a gain control that would allow an investor to optimize the DCA method.

The DCA method may also be used for selling units of a security periodically over an extended period. In this scenario, rather than a fixed dollar amount being used to purchase units of a security, a fixed dollar amount of the security is sold each period. However, DCA is not a desirable method for selling securities since the per-unit yield of the units sold would be less than the average price of the units over the extended period. Obviously, it is more desirable that the per-unit yield be greater than the average price.

In view of the foregoing, it is an object of the present invention to provide a method for automatically determining the number of units of a security to be purchased that yields a lower per-unit cost than DCA. It is also an object of the present invention to provide a method that allows an investor to adjust the number of units purchased based upon personal investment goals and/or market conditions. It is another object of the present invention to provide a method that allows an investor to determine the number of units of a security to be sold in each of a number of periods such that the per-unit yield of the units sold is higher than the average price of the security over the number of periods. It is yet another object of the of the present invention to provide a method that allows an investor to adjust the number of units sold based upon personal investment goals and/or market conditions.

SUMMARY OF THE INVENTION

In one aspect, the present invention is directed to a method of calculating a number N of units of a security to be traded at a unit price P in each of a series of consecutive periods based upon a desired monetary amount A for each of the consecutive periods. The method comprises establishing a baseline unit price $P_b$ not equal to zero and selecting a mathematical equation having the number N of units as an unknown term and comprising a function of the desired monetary amount A, the unit price P and the baseline unit price $P_b$. Then, the mathematical equation is solved for N.

In another aspect, the present invention is directed to a computer readable storage medium containing a computer program implementing a method of calculating a number N of units of a security to be traded at a unit price P in each of a series of consecutive periods based upon a desired monetary amount A for each of the consecutive periods, wherein the security has a baseline unit price $P_b$. First, a non-zero value is obtained for the baseline unit price $P_b$. A mathematical equation is then solved. The mathematical equation has the number N of units as an unknown term and comprises a function of the desired monetary amount A, the unit price P and the baseline unit price $P_b$. The number N of units is then outputted to at least one of a user display, a storage device and another computer.

In yet another aspect, the present invention is directed to a system for optimizing a number N of units of a security to be traded in each of a series of periods at a unit price P based upon a desired monetary amount A. The system includes a central processing unit and an application program for controlling said central processing unit. The application program contains a mathematical equation comprising a function of the desired monetary amount A, the unit price P and a baseline unit price $P_b$ not equal to zero. A memory is connected to the central processing unit and stores the application program.

In still another aspect, the present invention is directed to a method of determining a number N of units of a security to be traded in each of a series of periods. The method comprises establishing a baseline price $P_b$, a current unit price P and a desired monetary amount A for each period and determining the number N as a function of the baseline price $P_b$, the current unit price P, the desired monetary amount A and a gain constant K. When selling the security, the function automatically increases N when P is greater than $P_b$ and automatically decreases N when P is less than $P_b$. When purchasing the security, the function automatically decreases N when P is greater than $P_b$ and automatically increases N when P is less than $P_b$.

In a further aspect, the present invention is directed to a computer readable storage medium containing a computer program for implementing a method of determining a number N of units of a security to be traded in each of a series of periods. The method comprises establishing a baseline price $P_b$, a current unit price P and a desired monetary amount A for each period and determining the number N as a function of the baseline price $P_b$, the current unit price P, the desired monetary amount A and a gain constant K. When selling the security, the function automatically increases N when P is greater than $P_b$ and automatically decreases N when P is less than $P_b$. When purchasing the security, the function automatically decreases N when P is greater than $P_b$ and automatically increases N when P is less than $P_b$.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

FIGS. 6A and 6B show, respectively, one embodiment each of a SACIN worksheet and a SACOUT worksheet that may be used with the flow diagram illustrated in FIG. 5.

DETAILED DESCRIPTION OF THE INVENTION

Figure 1:
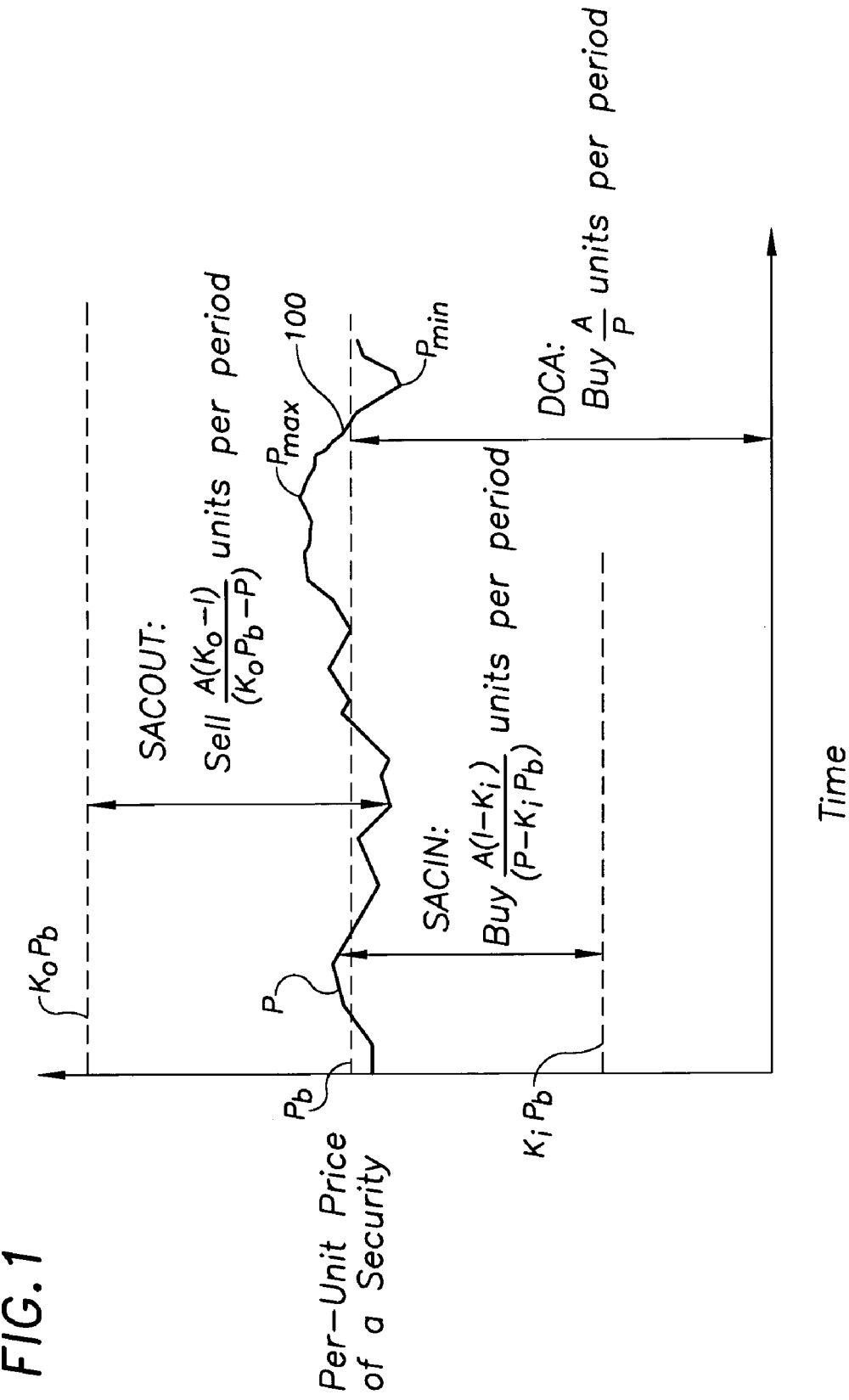
FIG. 1 is a graph of Per-Unit Price of a Security versus Time for one embodiment of the SACIN and SACOUT aspects of the present invention.

As an overview, the present invention is directed to a method for periodically trading units of a security or other investment instrument, such as stocks, bonds, mutual funds shares, options, futures and the like, in a fluctuating market in a manner that optimizes the per-unit dollar value of the corresponding transaction. In general, the method adjusts the number of units purchased or sold based upon the difference between a current unit price and a baseline unit price, such as an historical average price.

The method comprises equations for calculating the number of units to be traded in a given transaction period in accordance with certain rules for each of the purchasing and selling scenarios. In a purchasing scenario, the method reduces the number of units purchased when the current unit price is higher than the baseline unit price. Conversely, when the current unit price is lower than the baseline unit price, the method increases the number of units purchased. Using these rules, the per-unit price over a number of transaction periods is lower than the average unit price over the same transaction periods.

In a selling scenario, the method increases the number of units sold when the current unit price is above the baseline unit price. If the current unit price is below the baseline unit price, the method reduces the number of units sold. Accordingly, the per-unit price of the units sold over a number of transaction periods is higher than the average sale price over the same transaction periods.

Preferably, each equation selected for determining the number of units of a security to be purchased, or sold, during each of a plurality of transaction periods as a function of (1) a target amount of money for purchasing, or to be received from the sale of, the security during each transaction period, (2) a baseline unit price and (3) the current unit price during the corresponding transaction period. In a presently preferred embodiment, each equation further includes a gain control that, when all other variables are fixed, allows an investor to adjust the variation in the number of units traded caused by changes in the current unit price to suit his or her investment goals and/or to suit market conditions.

To illustrate the foregoing concepts, in a purchasing scenario a presently preferred embodiment, denoted SACIN (security average cost in), of periodically purchasing units of a security is to purchase a number N of units such that:

$$N = \frac{N_b}{P - K_i(P_b)} \quad \{2\}$$

where P is the current per-unit price of the security, $P_b$ is a baseline price of the security, $N_b$ is the number of units that could be purchased with a target nominal dollar amount A when the current price P equals the baseline price $P_b$, and $K_i$ is a gain constant where $0<K_i<1$. Since target dollar amount A and gain constant $K_i$ are determined by an investor and $N_b$ cannot be determined without A, $N_b$ can be written as a function of A and $K_i$ by setting $P=P_b$ and:

$$A = (N)P_b = \left(\frac{N_b}{P_b - K_i(P_b)}\right)P_b \quad \{3\}$$

The result is that $Nb=A(1-Ki)$. Substituting $A(1-Ki)$ for Nb in equation {2} yields:

$$N = \frac{A(1 - K_i)}{P - (K_i P_b)} \quad \{4\}$$

wherein the only unknown at the time of purchase is the number N of units to be purchased.

"It is worth noting that when Ki=0, Equation 4 reduces to N=A/P, which is equivalent to the equation of the DCA method."

As mentioned above, baseline price $P_b$ may be an historical average, but it may be another value such as the unit price of the security at the first purchase. The price of the security at the first purchase may be more conveniently obtained than an historical average.

TABLE 2 shows examples using the SACIN method to purchase units of a security monthly over a twelve-month period with three different values for $K_i$. The results shown in TABLE 2 may be compared to the results of the DCA example of TABLE 1, which uses the same period and current price information.

TABLE 2

| Security Price | | SACIN for A = $100/mo. and $P_b$ = $10/unit | | | | |
|---|---|---|---|---|---|---|
| Performance | | $K_i = .2$ | | $K_i = .5$ | | $K_i = .8$ |
| Mo. | P | $N = \frac{80}{P-2}$ | Cost = (P) × (N) | $N = \frac{50}{P-5}$ | Cost = (P) × (N) | $N = \frac{20}{P-8}$ | Cost = (P) × (N) |
| 1 | $10 | 10 | $100.00 | 10 | $100.00 | 10 | $100.00 |
| 2 | 11 | 8.89 | 97.79 | 8.33 | 91.63 | 6.67 | 73.37 |
| 3 | 9 | 11.43 | 102.87 | 12.5 | 112.50 | 20.00 | 180.00 |
| 4 | 10 | 10 | 100.00 | 10 | 100.00 | 10 | 100.00 |
| 5 | 11 | 8.89 | 97.79 | 8.33 | 91.63 | 6.67 | 73.37 |
| 6 | 9 | 11.43 | 102.87 | 12.5 | 112.50 | 20.00 | 180.00 |
| 7 | 10 | 10 | 100.00 | 10 | 100.00 | 10 | 100.00 |
| 8 | 11 | 8.89 | 97.79 | 8.33 | 91.63 | 6.67 | 73.37 |
| 9 | 9 | 11.43 | 102.87 | 12.5 | 112.50 | 20.00 | 180.00 |
| 10 | 10 | 10 | 100.00 | 10 | 100.00 | 10 | 100.00 |
| 11 | 11 | 8.89 | 97.79 | 8.33 | 91.63 | 6.67 | 73.37 |
| 12 | 9 | 11.43 | 102.87 | 12.5 | 112.50 | 20.00 | 180.00 |
| Total Cost | | | 1,202.64 | | 1,216.52 | | 1,413.48 |
| Total Units | | 121.28 | | 123.32 | | 146.68 | |
| Avg. Per-Unit Cost | | | $9.92 | | $9.86 | | $9.64 |

TABLE 2 shows that the average per-unit cost beneficially decreases as gain constant $K_i$ is increased. In addition, it is seen that the total purchase cost also increases as gain constant $K_i$ is increased, and for $K_i$ greater than zero the total purchase cost may be different from target amount A multiplied by the number of purchase periods. Thus, for an investor to optimize the SACIN embodiment for his or her own investment plan, the investor must weigh the ability to absorb the variability of actual purchase cost against the benefit of a low per-unit cost.

In a selling scenario a presently preferred embodiment for periodically selling units of a security, denoted SACOUT (security average cost out), is to sell a number N of units such that:

$$N = \frac{N_b}{K_o P_b - P} \quad \{5\}$$

where P is the current per-unit price of the security, $P_b$ is a baseline price of the security, $N_b$ is the number of units that could be sold to yield a nominal dollar amount A when the current price P is equal to the baseline price $P_b$, and $K_o$ is a gain constant greater than one. Since target dollar amount A and gain constant $K_o$ are determined by an investor and $N_b$ cannot be determined without A, unknown $N_b$ can be written as a function of A and $K_o$ by setting $P=P_b$ and:

$$A = (N)P_b = \left(\frac{N_b}{K_o(P_b) - P_b}\right)P_b \quad \{6\}$$

The result is that $N_b=A(K_o-1)$. Substituting $A(K_o-1)$ for $N_b$ in equation {5} yields:

$$N = \frac{A(K_o - 1)}{(K_o P_b) - P} \quad \{7\}$$

wherein the only unknown at the time of purchase is number N of units to be purchased.

TABLE 3 shows examples using the SACOUT method to sell units of a security monthly over a twelve-month period with three different values for $K_o$.

TABLE 3

| Security Price | | SACOUT for A = $100/mo. and $P_b$ = $10/unit | | | | | |
|---|---|---|---|---|---|---|---|
| Performance | | $K_o$ = 2.0 | | $K_o$ = 1.5 | | $K_o$ = 1.2 | |
| Mo. | P | $N = \frac{100}{20 - P}$ | Yield = (P) × (N) | $N = \frac{50}{15 - P}$ | Yield = (P) × (N) | $N = \frac{20}{12 - P}$ | Yield = (P) × (N) |
| 1 | $10 | 10 | $100.00 | 10 | $100.00 | 10 | $100.00 |
| 2 | 11 | 11.11 | 122.21 | 12.5 | 137.50 | 20 | 220.00 |
| 3 | 9 | 9.09 | 81.81 | 8.33 | 74.97 | 6.67 | 60.03 |
| 4 | 10 | 10 | 100.00 | 10 | 100.00 | 10 | 100.00 |
| 5 | 11 | 11.11 | 122.21 | 12.5 | 137.50 | 20 | 220.00 |
| 6 | 9 | 9.09 | 81.81 | 8.33 | 74.97 | 6.67 | 60.03 |
| 7 | 10 | 10 | 100.00 | 10 | 100.00 | 10 | 100.00 |
| 8 | 11 | 11.11 | 122.21 | 12.5 | 137.50 | 20 | 220.00 |
| 9 | 9 | 9.09 | 81.81 | 8.33 | 74.97 | 6.67 | 60.03 |
| 10 | 10 | 10 | 100.00 | 10 | 100.00 | 10 | 100.00 |
| 11 | 11 | 11.11 | 122.21 | 12.5 | 137.50 | 20 | 220.00 |
| 12 | 9 | 9.09 | 81.81 | 8.33 | 74.97 | 6.67 | 60.03 |
| Total Yield | | | 1,216.08 | | 1,249.88 | | 1,520.12 |
| Total Units | | 120.8 | | 123.32 | | 146.68 | |
| Avg. Per-Unit Yield | | | $10.07 | | $10.14 | | $10.36 |

TABLE 3 shows that the average per-unit yield beneficially increases as gain constant $K_o$ is decreased. In addition, it is seen that the total number of units sold and the total yield increase as gain constant $K_o$ is decreased. Thus, for an investor to optimize the SACOUT for his or her own investment plan, the investor must weigh the fact that the larger the gain constant $K_o$ is, the more the rate of depletion of the units owned may vary against the benefit of a high per-unit yield.

Referring now to the drawings, there is shown in FIG. 1 a graph 100 illustrating the SACIN and SACOUT embodiments, which are based upon, respectively, Equations {4} and {7}. Graph 100 visually illustrates a number of important relationships among gain constants $K_i$ and $K_o$, the actual transaction price P and number N of units traded during a particular transaction period. In the buying scenario, the product $K_i(P_b)$ should always be lower than the lowest actual price over a period of time. For example, $K_i(P_b)$ should be less than the lowest price at $P_{min}$. In addition, the closer actual transaction price P is to $K_i(P_b)$ or $K_o(P_b)$, the larger the number of units traded will be. This is so because the closer actual transaction price P is to $K_i(P_b)$, the closer the denominator of Equation {4} is to zero. To avoid the problem of buying too many units, which will result in an inordinately high total purchase cost, $K_i$ should be a value less than the minimum price $P_{min}$ divided by baseline price $P_b$. Similarly, in a selling scenario, to avoid an inordinate number of units being sold, $K_o$ should be a value greater than maximum price $P_{max}$ divided by baseline price $P_b$.

Figure 2:
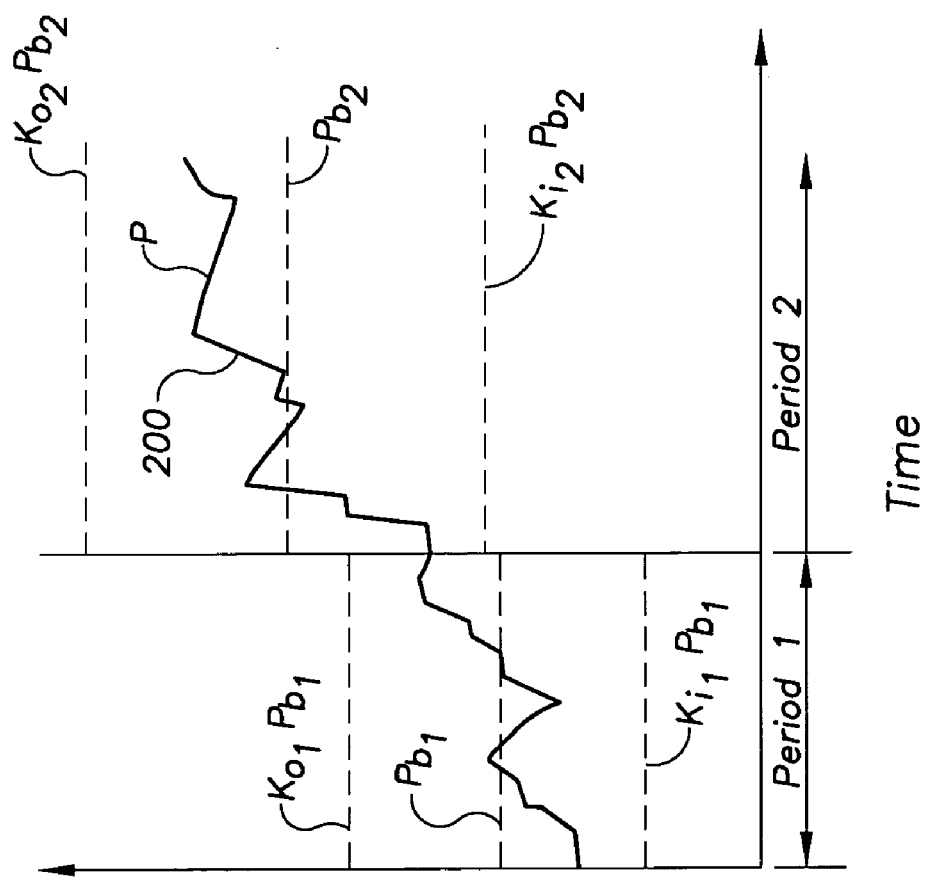
FIG. 2 is a graph of Per-Unit Price of a Security versus Time illustrating the use of the embodiment of FIG. 1 where the general trend of the price of the security is upward.

FIG. 2 shows a graph 200 of the SACIN and SACOUT embodiments for a security have an upward long-term trend. In this situation, it may be desirable to periodically adjust $K_i$, $K_o$ and/or $P_b$ to avoid purchasing or selling an inordinate number of units of the security. For example during Period 1, it may be desirable to use $K_{i_1}$ and $K_{o_{n1}}$ with $P_{b_1}$, and during Period 2, it may be desirable to use $K_{i_2}$ and $K_{o_2}$ with $P_{b_2}$. The lengths of Periods 1 and 2 and the magnitudes of $K_{i_1}$, $K_{i_2}$, $K_{o_1}$ and $K_{o_2}$ will depend on variables such as the slope of the long-term trend and the magnitudes of short-term fluctuations. Accordingly, and unlike DCA, the SACIN and SACOUT embodiments may be modified to optimize their performance to suit a particular investment goal and/or to suit particular market conditions.

Figure 3:
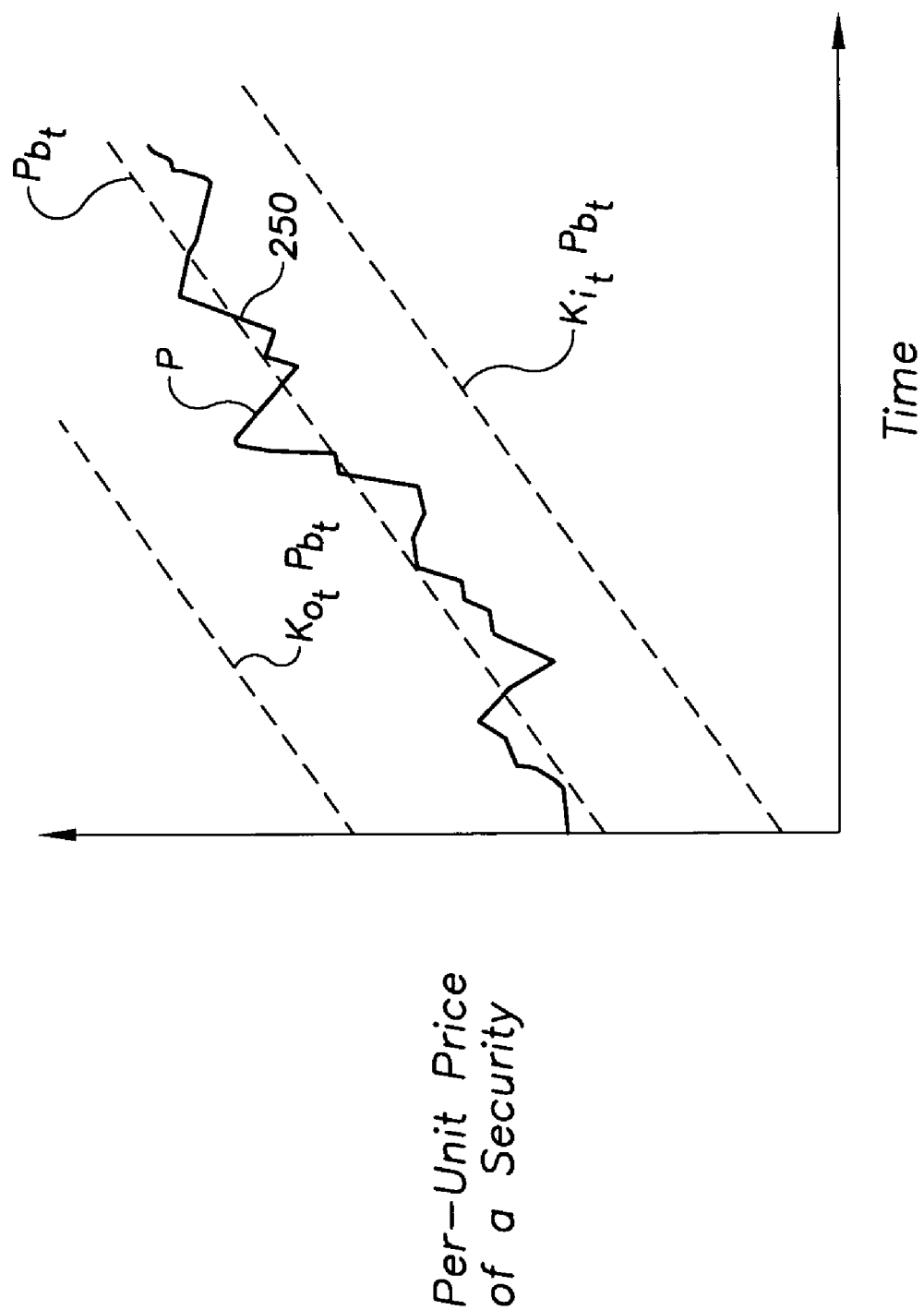
FIG. 3 is a graph of Per-Unit Price of a Security versus Time illustrating an alternative embodiment of the SACIN and SACOUT optimization methods of the present invention.

In another embodiment, gain constants $K_i$ and $K_o$ and baseline price $P_b$ need not be a fixed values but may vary with time. For example, as shown in graph 250 of FIG. 3, gain constants $K_{i_t}$ and $K_{o_t}$ and baseline price $P_{b_t}$ may take the slope of the long term trend of the unit price of the security.

Although the invention has been described in connection with particular equations for the SACIN and SACOUT methods, it is to be appreciated that the invention is not limited to only these equations. Rather, the invention encompasses other equations that define a number of units of a security that should be purchased or sold during a series of periodic transaction periods so as to optimize the per-unit purchase or sales price, as the case may be. A guideline in selecting other formulas is that such formulas identify the number of units of a security that should be purchased or sold with respect to a non-zero baseline price and/or using a gain control by, respectively, automatically (a) increasing the number of units purchased when the current per-unit price is lower than the baseline price and decreasing the number of units purchased when the current per-unit price is higher than the baseline price, for SACIN, and (b) decreasing the number of units sold when the current per-unit price is lower than the baseline price and increasing the number of units sold when the current per-unit price is higher than the baseline price, for SACOUT.

For example, in Equation {4} of the SACIN method as described above, $K_i$ must be less than one so that $K_i P_b$ is less than $P_b$ (see FIG. 1). However, an equation different from Equation 4 may be selected such that $K_i$ is greater than one and $K_i P_b$ is greater than $P_b$. An example of such an equation is:

$$N = \frac{A(K_i P_b - P)}{P_b^2(K_i - 1)} \quad \{8\}$$

Similarly, for SACOUT an equation other than Equation {7} may be selected such that a $K_o$ less than one and a $K_o P_b$ less than $P_b$ may be used. For example, such an equation may be:

$$N = \frac{A(P - K_o P_b)}{P_b^2(1 - K_o)} \quad \{9\}$$

In addition, equations other than Equations {4} and {7}-{9} may be used to determine the number of units to be transacted. Such equations include power functions, conical functions and trigonometric functions, among others. For example, a suitable power function for SACIN may be:

$$N = \frac{A}{P_b}\left(\frac{P_b}{P}\right)^n \quad \{10\}$$

where n is greater than zero and $K_i$ is zero, since there is no $K_i$ term in the equation. It is noted that when n=0, Equation {10} reduces to N=A/$P_b$, which results in buying the same number of units each period and when n=1, Equation {10} reduces to N=A/P, which is equivalent to DCA. One skilled in the art will recognize that Equations {4} and {7}-{10} are illustrative and are not intended to limit the scope of the invention defined by the claims appended hereto.

Figure 4:
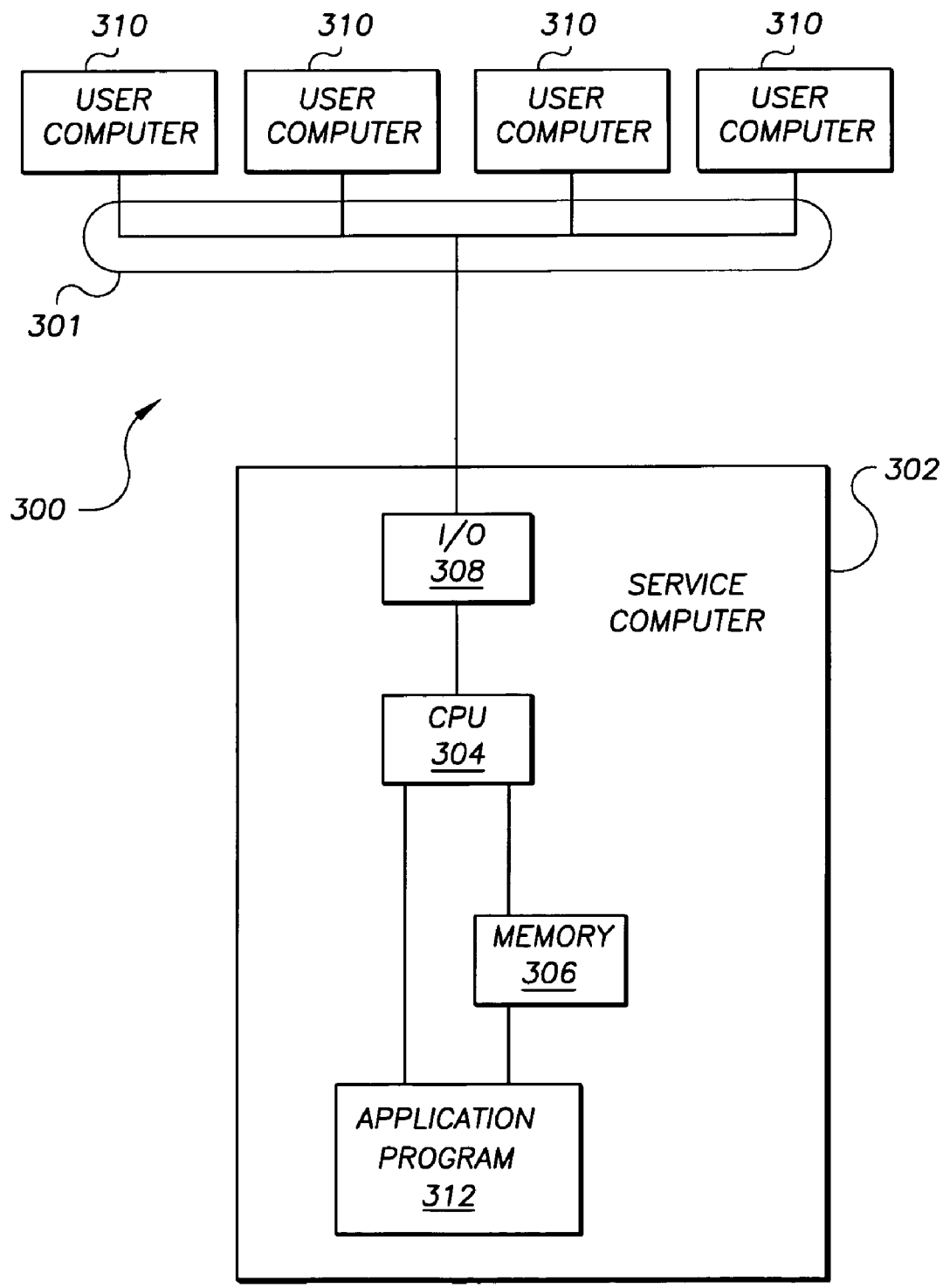
FIG. 4 is a block diagram illustrating a computer network containing a service computer implementing the SACIN and SACOUT optimization methods of the present invention.

FIG. 4 shows a computer system 300 that includes a network 301 and a service computer 302 connected to the network for performing the SACIN and/SACOUT optimization methods of the present invention over the network, which allows one or more users to use these methods. Network 301 may be the Internet, an Intranet, a local or wide area network (LAN or WAN) or a dial-in network. Network 301 may be wireless, linked by cable or optical fiber, or a combination thereof. Service computer 302 has a central processing unit (CPU) 304, typically one or more microprocessors, embedded controllers, ASICs or other logic devices, memory 306, typically fast access, low capacity memory such as RAM, and slower access, high capacity memory, such as optical and magnetic disk drives and an input/output (I/O) section 308, typically including various communication adapters for communicating with user computers 310 over network 301 and various device drivers for communicating with I/O devices such as a display, a keyboard, a printer and a mouse, among others. Service computer 302 will typically be a conventional server computer of the type used in client-server networks. Although described as a single computer, service computer 302 may comprise several linked computers, in a single or multiple locations.

Figures 2, 5:
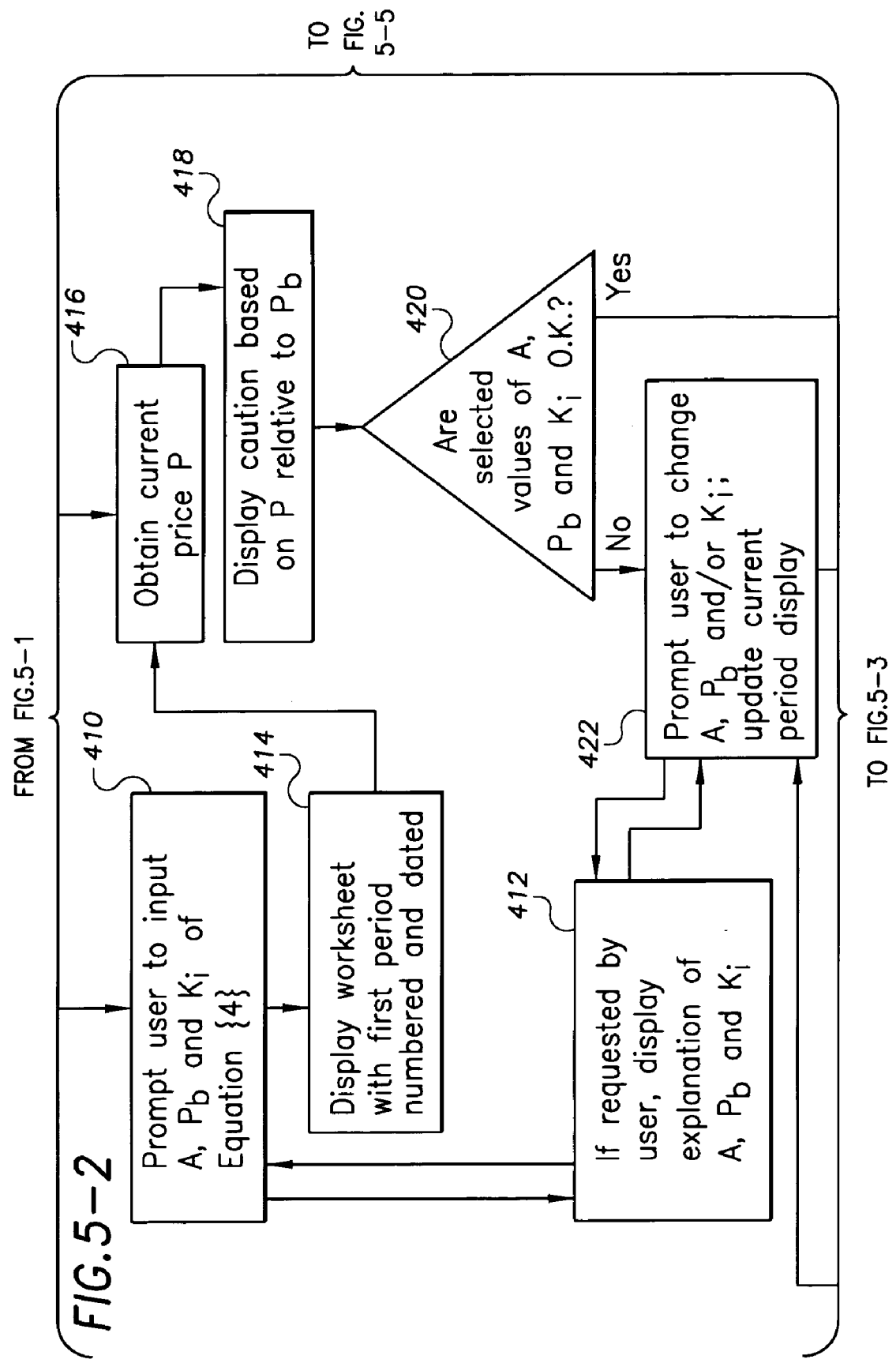
FIG. 5 is a flow diagram for implementing the embodiment of FIG. 1 in the application program of FIG. 4.
Figures 3, 5:
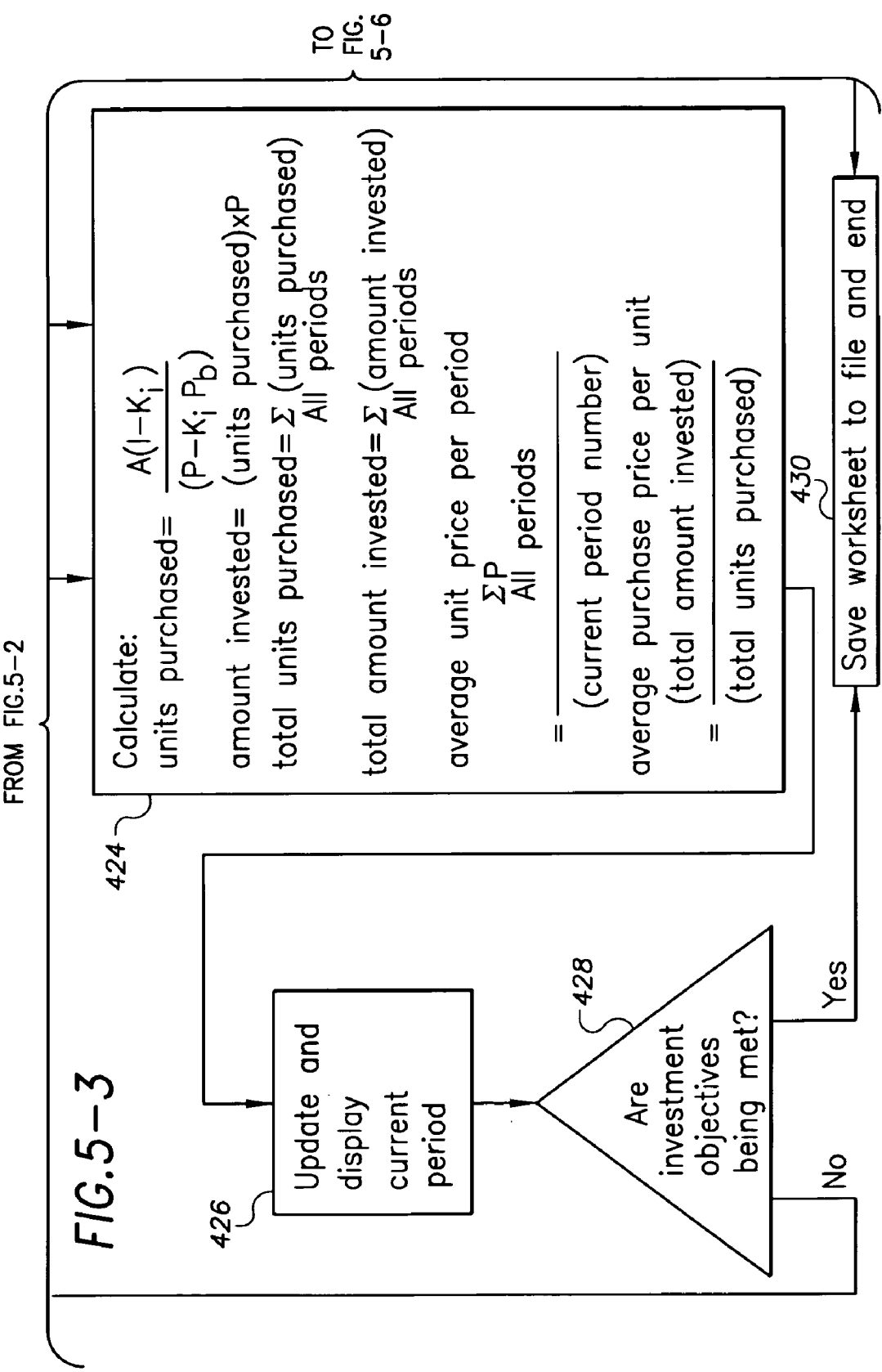

Service computer 302 also includes an application program 312 stored in memory 306. As described in detail below and as shown in FIG. 5, application program 312 contains computing steps for implementing the above-described SACIN and SACOUT optimization methods of the present invention. These steps are executed as logical operations by CPU 304 in combination with memory 306 and I/O section 308.

User computer 310 may be one of a wide variety of computing systems such as personal computers, set-top boxes, mobile telephones, personal digital assistants, so-called "network appliances," interactive TV and other electronic devices and venues. Each user computer 310 includes a display (not shown) or other output device for displaying text and/or graphics. While only four user computers 310 are illustrated in FIG. 4, it is to be appreciated that network 301 may contain millions, and some day even billions, of user computers, which could be located in offices, homes, cars, kiosks or be completely mobile.

Each user computer 310 includes a communications program (not shown) for communicating with service computer 302 over network 301. The communication program allows the service computer to prompt a user for particular input, receive such input, and display to the user via user computer 310 information, e.g., the tabular information presented in FIGS. 6A and 6B and described below in more detail. For example, if network 301 is the Internet, the communications program may be a conventional browser, such as that available from Microsoft Corporation, Redmond, Wash., under the trademark EXPLORER, and from Netscape Communications Corporation, Mountain View, Calif., under the trademark NAVIGATOR. Such communications programs are known in the art and, therefore, are not described in detail herein.

In addition to being implemented over a network, the SACIN and SACOUT optimization methods of the present invention may be implemented on a stand-alone computing device (not shown) such as a non-networked personal computers, hand-held calculator, personal digital assistant and the like. In this case, the stand-alone computing device would generally have the same features as service computer 302. That is, the stand-alone computing device would include a CPU 304, memory 306, application program 312 and I/O section 308. The stand-alone computing device would also include a display (not shown) for presenting text and/or graphics to a user and an input device that allows the user to input the data requested by application program 312.

FIGS. 5A–5B illustrate a flow diagram, denoted generally by the numeral 400, for one embodiment of application program 312. In particular, flow diagram 400 incorporates Equations {4} and {7} for the SACIN and SACOUT optimization methods, respectively. However, as mentioned above, the SACIN and SACOUT methods are not limited to these particular equations. In addition, the SACIN and SACOUT optimization methods may be implemented independent of one another in separate programs.

At step 402, application program 312 starts and prompts a user to select either the SACIN or SACOUT method, depending on whether the user is interested in purchasing or selling units of a security. If the user selects the SACIN method, at step 404 application program 312 prompts the user to select one of three functions, New Security, Recommend Periodic Purchase or Update Last Period with Actual Purchase Data. Although three functions are described, more or fewer functions may be provided. For example, a fourth function, Change Previous Period, may be provided for correcting errors or working through a number of purchasing scenarios. The Change Previous Period function could also include an option for allowing the user to save or discard any changes made during the session.

If the user selects the New Security function, at step 406 application program 312 displays to the user a brief explanation of the SACIN method. For example, application program 312 may display the following message: "When used for periodic purchases, SACIN automatically produces a per-unit cost lower that the average unit cost per period and dollar cost averaging (DCA) by investing more dollars when the price is low and fewer dollars when the price is high."

Next, at step 408 application program 312 prompts the user to change the default name of the worksheet from "New Investment" to any name the user desires. Preferably, the user should select the name of the security, such as "XYZ Company Common Stock," "ABC Growth Fund" or the like. If the user does not change the default name, application program 312 will use the default name. At step 410, application program 312 prompts the user to input the desired values for A, $P_b$ and $K_i$ of Equation {4}. If the user requests application program 312 for help, at step 412 application program 312 may display to the user explanations of A, $P_b$ and $K_i$. For example, for A, application program 312 may display the following: "A is the nominal dollar amount you wish to invest each period. You should monitor SACIN's total amount invested and adjust A, $P_b$ and/or $K_i$ to stay on track toward your long-term goals." For $P_b$, application program 312 may display the following: "$P_b$ is not very critical, it is simplest to use the current unit price. You can also use a recent historical price to estimate an average price during the SACIN period." For $K_i$, application program 312 may display the following: "$K_i$ is a gain control. The larger $K_i$ is, the more the periodic investment will change with price and the lower your per-unit cost will be. $K_i=0$ provides a constant dollar investment as in dollar cost averaging (DCA). Above $K_i=0.5$, a falling current price will result in larger investments." Application program 312 may be configured to display the explanations all at once or one at a time, depending on the user's request.

Figures 5, 6, 7:
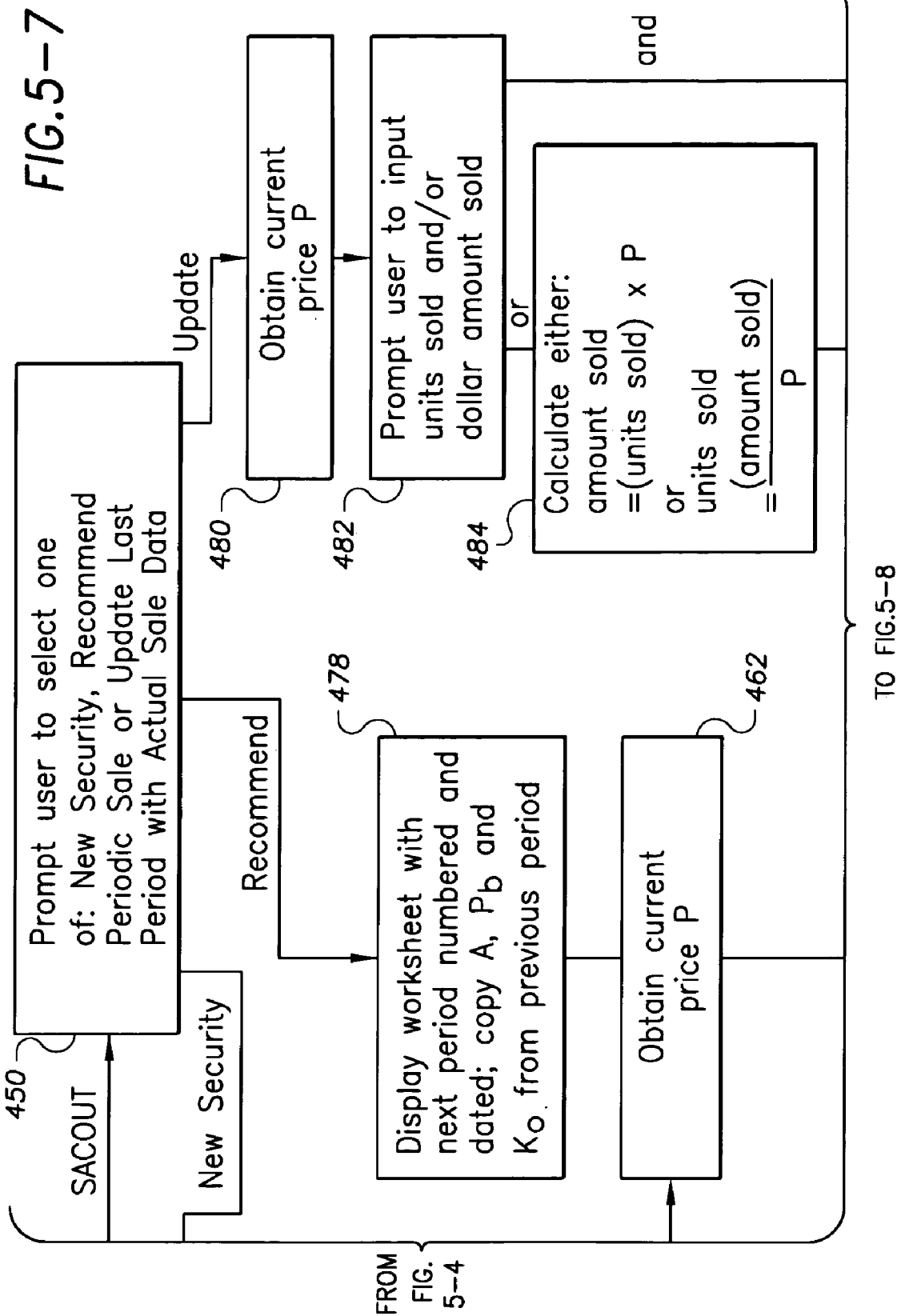
Figures 5, 6, 7, 8, 9:
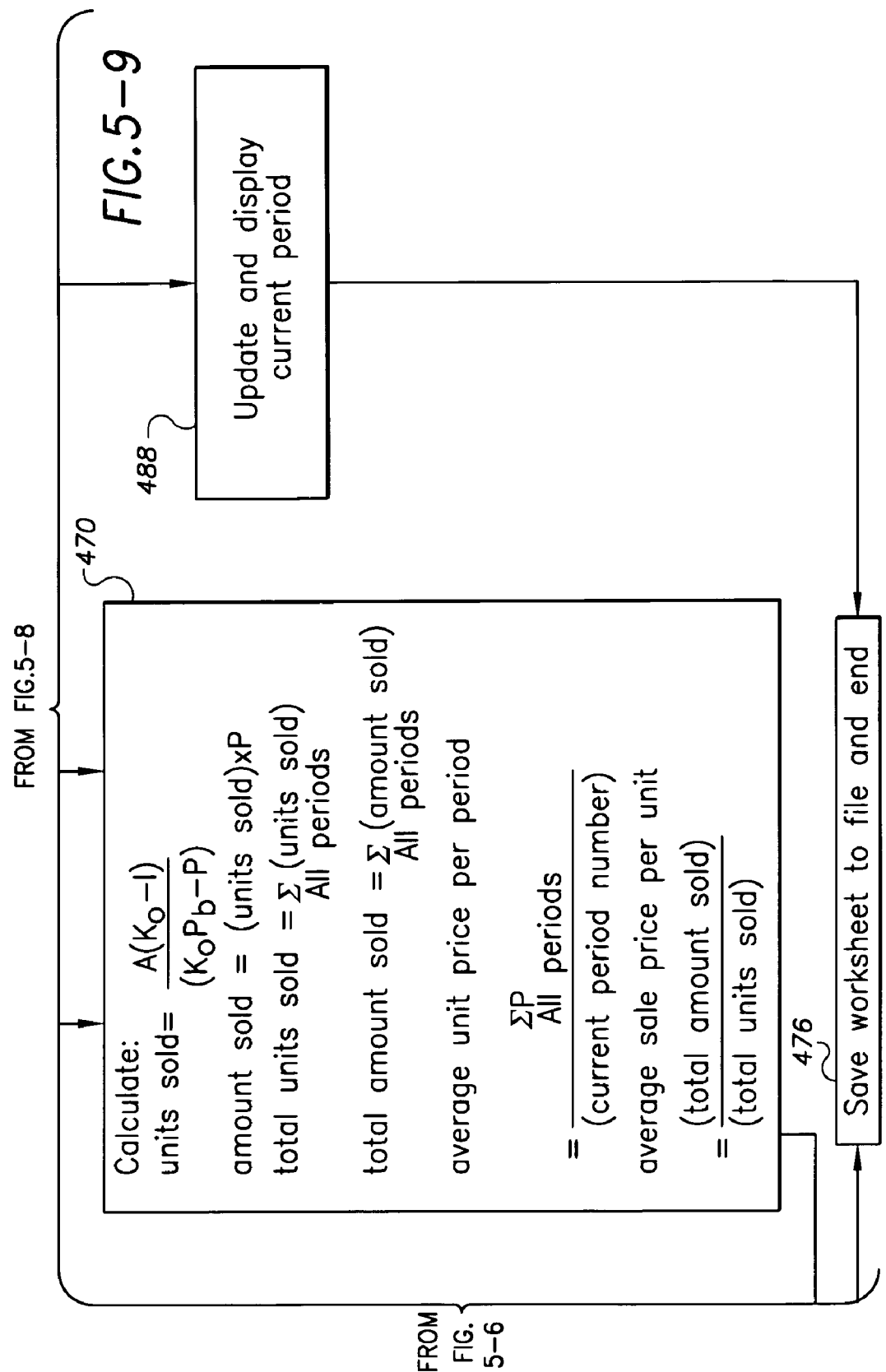

After the user inputs values for A, $P_b$ and $K_i$, at step 414 application program 312 displays to the user a worksheet 500, see FIG. 6A, having a first period numbered and dated with the current date. Alternatively, application program 312 may prompt the user to input a date to be associated with the first period. Next, at step 416 application program 312 obtains the current price P of a unit of the security. Application program 312 may obtain the price by querying the user or linking to a database, e.g., a database maintained by a brokerage house or an online provider of such information. After application program 312 obtains the current price P, at step 418 application program 312 displays a caution based upon current price P relative to baseline price $P_b$. For example, if current price P is less than baseline price $P_b$, application program 312 may display the following: "If P lowers and approaches $(K_i) \times (P_a)$ large purchases will result." However, if current price P is greater than baseline price $P_b$, application program 312 may display the following: "Large increases in P reduce the gain."

At step 420, application program 312 queries the user as to whether or not he or she is satisfied with the selected values of A, $P_b$ and $K_i$. If the user is not satisfied, at step 422 application program 312 prompts the user to change any or all of the previously selected values of A, $P_b$ and $K_i$. The user may seek help from application program 312, at which point application program 312 displays the explanations of the variable at step 412, which is described above. If the user is satisfied with the selected values of A, $P_b$ and $K_i$, at step 424 application program 312 calculates the remaining information presented on worksheet 500, i.e., units purchased, amount invested, total units purchased, total amount invested, average unit price per period and average purchase price per-unit, to be displayed in worksheet 500. At step 426, worksheet 500 is updated and the information for the entire period is displayed. At step 428, application program 312 queries the user as to whether or not his or her investing objectives are being met. If the user answers in the negative, application program 312 returns to step 422 and prompts the user to change one or more of A, $P_b$ and $K_i$, after which application program 312 executes the subsequent steps until step 428 is again reached. If the user answers in the affirmative, at step 430 worksheet 500 is saved and application program 312 is ended. Alternatively, application program 312 may return to step 402 to allow the user to change from SACIN to SACOUT, add a new period, enter a new security or the like.

If the user selects Recommend Periodic Purchase at step 404, application program 312 proceeds to step 432 where the program displays worksheet 500 with a new period consecutively numbered and dated with the current date. The new period is preferably displayed with the column headings 502 as many previous periods as will fit on the output device, typically a screen of a computer monitor. Application program 312 also copies from the immediately preceding period the values for A, $P_b$ and $K_i$ and displays them in worksheet 500. After step 432, application program 312 proceeds to steps 416–430 as described above with respect to the New Security Function.

If the user selects Update Last Period with Actual Purchase Data at step 404, application program 312 proceeds to step 434 where the program obtains the current price P in a manner similar to step 416. At step 436, application program 312 then prompts the user to input the actual number of units purchased and/or the actual amount invested. If the user provides only one of the requested values, at step 438 application program 312 calculates the other and then proceeds to step 440. If the user provides both of the requested values, application program 312 proceeds immediately from step 436 to 440.

At step 440, application program 312 calculates the total units purchased, total amount invested, average unit price per period and average purchase price per-unit. Then, at step 442 application program 312 updates the current period and displays the current period in worksheet 500. After program displays updated worksheet 500, application program 312 proceeds to step 430 in which worksheet 500 is saved and the program is ended. Alternatively, application program 312 may return to step 402 to allow the user to change from SACIN to SACOUT, add a new period, enter a new security or the like.

In an alternative embodiment of the SACIN method of application program 312, if the user answers the query of step 428 in the affirmative, application program 312 may provide an option that would link the SACIN aspect of application program 312 to a trading program that would allow the user to purchase the recommended number of units. The trading program could then transmit the actual purchase data, i.e., the current price P, number of units purchased and/or the amount invested, to the Update Last Period with Actual Purchase Data function at steps 434 and 436 to automatically update the latest investment period.

If the user selects SACOUT at step 402, application program 312 proceeds to step 450 and prompts the user to select one of three functions, New Security, Recommend Periodic Sale or Update Last Period with Actual Sale Data. Although three functions are described, more or fewer function may be provided. For example, a fourth function, Change Previous Period, may be provided for correcting errors or working through a number of selling scenarios. The Change Previous Period function could also include an option for allowing the user to save or discard any changes made during the session.

If the user selects the New Security function, at step 452 application program 312 displays to the user a brief explanation of the SACOUT method. For example, application program 312 may display the following message: "When used for periodic sales, SACOUT automatically produces a per-unit cost of units sold higher than the average unit cost per period by selling more units when the price is high and fewer when the price is low."

Next, at step 454 application program 312 prompts the user to change the default name of the worksheet from "New Sale" to any name the user desires. Preferably, the user should select the name of the security, such as "XYZ Company Common Stock," "ABC Growth Fund" or the like. If the user does not change the default name, application program 312 will use the default name. At step 456, application program 312 prompts the user to input the desired values for A, $P_b$ and $K_o$ of Equation {7}. If the user requests application program 312 for help, at step 458 the program may display to the user explanations of A, $P_b$ and $K_o$. For example, for A, application program 312 may display the following: "A is the nominal dollar amount you wish to sell each period. You should monitor SACOUT's total amount sold and total units sold and adjust A, $P_b$ and/or $K_o$ to stay on track toward your long-term goals." For $P_b$, application program 312 may display the following: "$P_b$ is not very critical, its simplest to use the current unit price. You can also use a recent historical price to estimate an average price during the SACOUT period." For $K_o$, application program 312 may display the following: "$K_o$ is a gain control. The smaller $K_o$ is, the more the periodic sale will change with price and the higher your per-unit sale price will be. A large number for $K_o$ approaches selling a fixed number of units per period, which results in your average per-unit sale price equaling the average per-unit sale price per period. This is better than selling a fixed dollar amount per period, which is dollar cost averaging (DCA) for the buyer. When $K_o$ is close to 1, a rising price will result in larger sales." Application program 312 may be configured to display the explanations all at once or one at a time, depending on the user's request.

After the user inputs values for A, $P_b$ and $K_i$, at step 460 application program 312 displays to the user a worksheet 510, see FIG. 6B, having a first period numbered and dated with the current date. Alternatively, application program 312 may prompt the user to input a date to be associated with the first period. Next, at step 462 application program 312 obtains the current price P of a unit of the security. Application program 312 may obtain the price by querying the user or linking to a database, e.g., a database maintained by a brokerage house or an online provider of such information. After application program 312 obtains the current price P, at step 464 the program displays a caution based upon current price P relative to baseline price $P_b$. For example, if current price P is greater than baseline price $P_b$, application program 312 may display the following: "If P increases and approaches $(K_o) \times (P_a)$, large sales will result." However, if current price P is less than baseline price $P_b$, application program 312 may display the following: "Large decreases in P reduce the gain."

At step 466, application program 312 queries the user as to whether or not he or she is satisfied with the selected values of A, $P_b$ and $K_o$. If the user is not satisfied, at step 468 application program 312 prompts the user to change any or all of the previously selected values of A, $P_b$ and $K_o$. The user may seek help from application program 312, at which point the program displays the explanations of the variable at step 458, which is described above. If the user is satisfied with the selected values of A, $P_b$ and $K_o$, at step 470 application program 312 calculates the remaining information presented on worksheet 510, i.e., units sold, dollar amount sold, total units sold, total dollar amount sold, average unit sale price per period and average sale price per-unit, to be displayed in worksheet 500. At step 472, worksheet 510 is updated and the information for the entire period is displayed. At step 474 application program 312 queries the user as to whether or not his or her investing objectives are being met. If the user answers in the negative, application program 312 returns to step 468 and prompts the user to change one or more of A, $P_b$ and $K_o$, after which application program 312 executed the subsequent steps until step 474 is again reached. If the user answers in the affirmative, at step 476 worksheet 510 is saved and application program 312 is ended. Alternatively, application program 312 may return to step 402 to allow the user to change from SACOUT to SACIN, add a new period, enter a new security or the like.

If the user selects Recommend Periodic Sale at step 450, application program 312 proceeds to step 478 where the program displays worksheet 510 with a new period consecutively numbered and dated with the current date. The new period is preferably displayed with the column headings 512 as many previous periods as will fit on the output device, typically a screen of a computer monitor. Application program 312 also copies from the immediately preceding period the values for A, $P_b$ and $K_o$ and displays them in worksheet 510. After step 478, application program 312 proceeds to steps 462–476 as described above with respect to the New Security Function.

If the user selects Update Last Period with Actual Sale Data at step 450, application program 312 proceeds to step 480 where the program obtains the current price P in a manner similar to step 462. At step 482, application program 312 then prompts the user to input the actual number of units sold and/or the actual dollar amount sold. If the user provides only one of the requested values, at step 484 application program 312 calculates the other and then proceeds to step 486. If the user provides both of the requested values, application program 312 proceeds immediately from step 482 to 486.

At step 486, application program 312 calculates the total units sold, total dollar amount sold, average unit sale price per period and average sale price per-unit. Then, at step 488 application program 312 updates the current period and displays the current period in worksheet 510. After program displays updated worksheet 510, application program 312 proceeds to step 476 in which worksheet 510 is saved and the program is ended. Alternatively, application program 312 may return to step 402 to allow the user to change from SACOUT to SACIN, add a new period, enter a new security or the like.

In an alternative embodiment of the SACOUT method of application program 312, if the user answers the query of step 474 in the affirmative, application program 312 may provide an option that would link the SACOUT aspect of application program 312 to a trading program that would allow the user to sell the recommended number of units. The trading program could then transmit the actual sale data, i.e., the current price P, number of units sold and/or the dollar amount sold, to the Update Last Period with Actual Sales Data function at steps 480 and 482 to automatically update the latest investment period.

While the present invention has been described in connection with preferred embodiments of its various aspects, it will be understood that it is not so limited. On the contrary, it is intended to cover all alternatives, modifications and equivalents as may be included within the spirit and scope of the invention as defined in the appended claims.

What is claimed is:

1. A method of trading a number N of units of a security at a unit price P in each of a series of consecutive periods based upon a desired monetary amount A for each consecutive period in the series of consecutive periods, the method comprising the steps of:
   a) establishing a value of a baseline unit price Pb greater than zero;
   b) selecting a mathematical equation for determining the number N of units as an unknown term, said mathematical equation comprising a function of the desired monetary amount A, the unit price P and said baseline unit price Pb;
   c) causing a computer to solve said mathematical equation for the number N of units for at least one consecutive period in the series of consecutive periods; and
   d) trading in each consecutive period of the series of consecutive periods the number N of units determined by said computer in step c) for that consecutive period.

2. A method according to claim 1, wherein said value of said baseline unit price Pb is equal to the unit price P at the first of the series of consecutive periods.

3. A method according to claim 1, wherein N is the number of units to be purchased and said equation automatically increases N as the unit price P falls and decreases N as the unit price P rises.

4. A method according to claim 3, wherein said mathematical equation further includes a gain constant K that adjusts the gain of said mathematical equation to control the magnitude of the change in units N resulting from the difference between the baseline unit price Pb and the unit price P.

5. A method according to claim 4, wherein said mathematical equation is:

$$N = \frac{A(1-K)}{P-(KP_b)}.$$

6. A method according to claim 1, wherein N is the number of units to be sold and said mathematical equation automatically increases N as the unit price P rises and decreases N as the unit price P falls.

7. A method according to claim 6, wherein said mathematical equation further includes a gain constant K that adjusts the gain of said mathematical equation to control the magnitude of the change in units N resulting from the difference between the baseline unit price Pb and the unit price P.

8. A method according to claim 7, wherein said mathematical equation is:

$$N = \frac{A(K-1)}{(KP_b)-P}.$$

9. A method according to claim 1, wherein step c) comprising solving said mathematical equation for the number N of units for each consecutive period in the series of consecutive periods using said value of said baseline unit price Pb.

10. A computer readable storage medium containing instructions that are executable by a computer, the instructions implementing a method of trading a number N of units of a security to be traded at a unit price P in each of a series of consecutive periods based upon a desired monetary amount A for each consecutive period in the series of consecutive periods, the security having a baseline unit price Pb, the instructions comprising:
   a) a first set of instructions for obtaining a value for the baseline unit price Pb greater than zero;
   b) a second set of instructions for solving a mathematical equation for the number N of units for at least one consecutive period in the series of consecutive periods, said mathematical equation comprising a function of the desired monetary amount A, the unit price P and said value of the baseline unit price Pb; and
   c) a third set of instructions outputting the number N of units for said at least one consecutive period in the series of consecutive periods to at least one of a user display, a storage device and another computer.

11. A computer readable storage medium according to claim 10, wherein said value of said baseline unit price Pb is equal to the unit price P at the first of the series of consecutive periods.

12. A computer readable storage medium according to claim 10, wherein N is the number of units to be purchased and said equation automatically increases N as the unit price P falls and decreases N as the unit price P rises.

13. A computer readable storage medium according to claim 12, wherein said mathematical equation further includes a gain constant K that adjusts the gain of said mathematical equation to control the magnitude of the change in units N resulting from the difference between the baseline unit price Pb and the unit price P.

14. A computer readable storage medium according to claim 13, wherein said mathematical equation is:

$$N = \frac{A(1-K)}{P - (KP_b)}.$$

15. A computer readable storage medium according to claim 10, wherein N is the number of units to be sold and said mathematical equation automatically increases N as the unit price P rises and decreases N as the unit price P falls.

16. A computer readable storage medium according to claim 15, wherein said mathematical equation further includes a gain constant K that adjusts the gain of said mathematical equation to control the magnitude of the change in units N resulting from the difference between the baseline unit price Pb and the unit price P.

17. A computer readable storage medium according to claim 16, wherein said mathematical equation is:

$$N = \frac{A(K-1)}{(KP_b) - P}.$$

18. A computer readable storage medium according to claim 10, wherein step b) of the method comprises solving said mathematical equation for the number N of units for each consecutive period in the series of consecutive periods using said value of said baseline unit price Pb.

19. A system for optimizing a number N of units of a security to be traded in each of a series of periods at a unit price P based upon a desired monetary amount A, the system comprising:
 a) a central processing unit;
 b) an application program for controlling said central processing unit, said application program containing a mathematical equation for determining the number N of units for each period of the series of periods comprising a function of the desired monetary amount A, the unit price P and a value of a baseline unit price Pb greater than zero; and
 c) memory connected to said central processing unit and storing said application program, said memory containing the number N of units for each period of the series of period, wherein the number N of units for each period is a function of said value of said baseline unit price Pb.

20. A system according to claim 19, further comprising an I/O section connected to said central processing unit, said I/O section connected to at least one output device.

21. A system according to claim 20, wherein said at least one output device is a display.

22. A system according to claim 19, wherein said system further comprises a service computer attachable to a network, said service computer containing said central processing unit, said application program and said memory.

23. A system according to claim 19, wherein the series of periods has a first period and said value of said baseline unit price Pb is equal to the unit price P at said first period.

24. A system according to claim 19, wherein N is the number of units to be purchased and said equation automatically increases N as the unit price P falls and decreases N as the unit price P rises.

25. A system according to claim 24, wherein said mathematical equation further includes a gain constant K that adjusts the gain of said mathematical equation to control the magnitude of the change in the number N of units resulting from the difference between the baseline unit price Pb and the unit price P.

26. A system according to claim 25, wherein said mathematical equation is:

$$N = \frac{A(1-K)}{P - (KP_b)}.$$

27. A system according to claim 19, wherein N is the number of units to be sold and said mathematical equation automatically increases N as the unit price P rises and decreases N as the unit price P falls.

28. A system according to claim 27, wherein said mathematical equation further includes a gain constant K that adjusts the gain of said mathematical equation to control the magnitude of the change in units resulting from the difference between the baseline unit price Pb and the unit price P.

29. A system according to claim 28, wherein said mathematical equation is:

$$N = \frac{A(K-1)}{(KP_b) - P}.$$

30. A system according to claim 19, wherein said central processing unit is operative with said application program to determine a number N of units of securities to be traded using said mathematical equation.

31. A method of trading a number N of units of a security in each period of a series of periods, the method comprising the steps of:
 a) establishing a value for a baseline price Pb of the security, a current unit price P of the security and a desired monetary amount A for each period; and
 b) causing a computer to determine the number N of units for at least one period of the series of periods as a function of said value of said baseline price Pb, said current unit price P, said desired monetary amount A and a gain constant K, wherein
  i) when selling the security, said function automatically increases N when P is greater than Pb and automatically decreases N when P is less than Pb; and
  ii) when purchasing the security, said function automatically decreases N when P is greater than Pb and automatically increases N when P is less than Pb.

32. A method according to claim 31, wherein step b) comprising determining the number N of units for each period of the series of periods as a function of said value of said baseline price Pb.

33. A computer readable storage medium containing instructions that are executable by a computer, the instructions for implementing a method of trading a number N of units of a security in each period of a series of periods, the instructions comprising:
 a) a first set of instructions for establishing a value for a baseline price Pb of the security, a current unit price P of the security and a desired monetary amount A for each period; and
 b) a second set of instructions for determining the number N of units for at least one period of the series of periods as a function of said value of said baseline price Pb, said current unit price P, said desired monetary amount A and a gain constant K, wherein:
  i) when selling the security, said function automatically increases N when P is greater than Pb and automatically decreases N when P is less than Pb; and
  ii) when purchasing the security, said function automatically decreases N when P is greater than Pb and automatically increases N when P is less than Pb.

34. A computer readable storage medium according to claim 33, wherein step b) of the method comprises determining the number N of units for each period of the series of periods as a function of said value of said baseline price Pb.

* * * * *